(12) United States Patent
Farkas (10) Patent No.: US 10,836,269 B2
(45) Date of Patent: Nov. 17, 2020

(54) PARKING LOT BUMPER INDUCTIVE CHARGER WITH AUTOMATIC PAYMENT PROCESSING

(76) Inventor: Michael Farkas, Miami Beach, FL (US)

(*) Notice: Subject to any disclaimer, the term of this patent is extended or adjusted under 35 U.S.C. 154(b) by 0 days.

(21) Appl. No.: 13/600,058

(22) Filed: Aug. 30, 2012

(65) Prior Publication Data

US 2013/0049683 A1 Feb. 28, 2013

Related U.S. Application Data

(60) Provisional application No. 61/529,016, filed on Aug. 30, 2011.

(51) Int. Cl.
| | |
|---|---|
| *H02J 7/00* | (2006.01) |
| *B60L 53/30* | (2019.01) |
| *H02J 50/80* | (2016.01) |
| *H02J 50/90* | (2016.01) |
| *H02J 50/10* | (2016.01) |

(Continued)

(52) U.S. Cl.
CPC ............. *B60L 53/30* (2019.02); *B60L 3/003* (2013.01); *B60L 3/0069* (2013.01); *B60L 3/04* (2013.01); *B60L 3/12* (2013.01); *B60L 53/122* (2019.02); *B60L 53/126* (2019.02); *B60L 53/305* (2019.02); *B60L 53/36* (2019.02); *B60L 53/65* (2019.02); *B60L 53/665* (2019.02); *G07F 15/005* (2013.01); *H02J 7/00* (2013.01); *H02J 7/025* (2013.01); *H02J 13/00* (2013.01); *H02J 13/0006* (2013.01); *H02J 50/10* (2016.02); *H02J 50/80* (2016.02); *H02J 50/90* (2016.02); *B60L 2240/70* (2013.01); *B60L 2250/12* (2013.01); *B60L 2250/20* (2013.01); *H02J 7/00045* (2020.01); *Y02T 10/70* (2013.01); *Y02T 10/7072* (2013.01); *Y02T 10/72* (2013.01); *Y02T 90/12* (2013.01); *Y02T 90/14* (2013.01); *Y02T 90/16* (2013.01); *Y02T 90/167* (2013.01); *Y04S 30/14* (2013.01)

(58) Field of Classification Search
CPC .......... H02J 7/025; Y02T 90/12; G06Q 20/40
USPC ....................... 320/108–109; 701/22; 702/63
See application file for complete search history.

(56) References Cited

U.S. PATENT DOCUMENTS

| | | |
|---|---|---|
| 4,347,472 A | 8/1982 | Lemelson |
| 5,654,621 A | 8/1997 | Seelig |

(Continued)

*Primary Examiner* — Zixuan Zhou
(74) *Attorney, Agent, or Firm* — Mark Terry (57) ABSTRACT

A charging station for an electric vehicle, including payment processing over a communications network, is disclosed. The charging station includes a housing having an elongated shape emulating a parking bumper, including an elongated planar element disposed at an acute angle to a floor and designed to provide a barrier to wheels of the electric vehicle, an inductive charging element, a sensor for detecting a location of the electric vehicle in relation to the planar element of the charging station, a radio frequency receiver for receiving a signal including a unique identifier associated with the electric vehicle, a network interface controller configured for transmitting the unique identifier to a server and for receiving confirmation of payment for inductive charging provided to the electric vehicle and a processor configured for activating the inductive charging element to provide inductive charging to the electric vehicle responsive to receiving the confirmation of payment.

19 Claims, 6 Drawing Sheets

(51) Int. Cl.

| | |
|---|---|
| *H02J 7/02* | (2016.01) |
| *H02J 13/00* | (2006.01) |
| *B60L 3/00* | (2019.01) |
| *B60L 3/12* | (2006.01) |
| *B60L 3/04* | (2006.01) |
| *G07F 15/00* | (2006.01) |
| *B60L 53/66* | (2019.01) |
| *B60L 53/36* | (2019.01) |
| *B60L 53/65* | (2019.01) |
| *B60L 53/122* | (2019.01) |
| *B60L 53/126* | (2019.01) |

(56) References Cited

U.S. PATENT DOCUMENTS

| | | | |
|---|---|---|---|
| 5,821,731 A * | 10/1998 | Kuki | B60L 11/1805 |
| | | | 320/108 |
| 6,614,204 B2 | 9/2003 | Pellegrino et al. | |
| 7,956,570 B2 | 6/2011 | Lowenthal et al. | |
| 8,138,715 B2 | 3/2012 | Lowenthal et al. | |
| 8,138,718 B2 | 3/2012 | Dower | |
| 2007/0080827 A1 | 4/2007 | Huang | |
| 2007/0126395 A1 | 6/2007 | Suchar | |
| 2009/0287578 A1 | 11/2009 | Paluszek et al. | |
| 2010/0161481 A1* | 6/2010 | Littrell | B60L 3/12 |
| | | | 705/40 |
| 2010/0274678 A1* | 10/2010 | Rolf | G06Q 20/04 |
| | | | 705/17 |
| 2010/0308768 A1* | 12/2010 | Dower | B60L 11/1818 |
| | | | 320/109 |
| 2011/0010281 A1 | 1/2011 | Wass | |
| 2011/0285349 A1 | 11/2011 | Widmer et al. | |
| 2011/0302078 A1 | 12/2011 | Failing | |

\* cited by examiner

PARKING LOT BUMPER INDUCTIVE CHARGER WITH AUTOMATIC PAYMENT PROCESSING

CROSS-REFERENCE TO RELATED APPLICATIONS

This patent application claims priority to provisional patent application No. 61/529,016 filed Aug. 30, 2011 and titled "Parking Lot Bumper Inductive Charger." The content of provisional patent application No. 61/529,016 is hereby incorporated by reference in its entirety.

STATEMENT REGARDING FEDERALLY SPONSORED RESEARCH OR DEVELOPMENT

Not Applicable.

INCORPORATION BY REFERENCE OF MATERIAL SUBMITTED ON A COMPACT DISC

Not Applicable.

FIELD OF THE INVENTION

The present invention relates to the field of electric vehicles and, more specifically, the present invention relates to the field of inductive charging of battery units of electric vehicles.

BACKGROUND OF THE INVENTION

The green energy movement and dwindling fossil fuel supplies have spawned the commercial electric vehicle industry. Currently, charging stations are used to recharge the batteries of electric vehicles. A charging station usually comprises a standalone, vertical post or a box-like unit attached to a wall or other structural element. A charging station includes electrical elements for the charging process, a cord extending from the station and a socket at the end of the cord for connecting to a terminal on an electric vehicle. Typically, an electric vehicle driver will park the electric vehicle next to the charging station, plug the socket of the cord into the terminal of the electric vehicle and then wait for charging of the electric vehicle's batteries to complete.

The currently available charging stations require the stations to be installed in areas that provide access to vehicles, such as parking lots and garages. Unfortunately, installation of charging stations in these areas can produce visual and physical clutter and can reduce space in already-congested locales. Further, the currently available charging stations require drivers to physically connect the cord of the charging station to the terminal of the electric vehicle. This can be cumbersome for some individuals, such as handicapped persons, and further opens the possibility of user error, which can produce a hazardous situation.

Due to the limited driving range of currently available electric vehicles, a network of for-pay, publicly available charging stations have come into existence. This allows drivers of electric vehicles to travel in an extended range. Typically, publicly available charging stations include a point-of-sale system that allow for payment via a purchase card (including credit cards, charge cards, debit cards, gift cards, points cards, etc.). One of the drawbacks associated with this point-of-sale system is that it requires purchase cards to be swiped through a card reader or for the purchase card data to be input manually. These actions must be performed even for repeat visits by the same driver. These constraints can be time consuming and tedious for drivers that are in a hurry and therefore limit the locations and circumstances where purchase cards can be used.

Therefore, what is needed is a system and method for improving the problems with the prior art, and more particularly for a more efficient apparatus and system for providing charging capabilities to electric vehicles in a user-friendly and safe manner, while simplifying the point-of-sale process.

BRIEF SUMMARY OF THE INVENTION

In one embodiment, the present invention discloses a charging station for an electric vehicle, including payment processing over a communications network. The charging station includes a housing having an elongated shape emulating a parking bumper, including an elongated planar element disposed at an acute angle to a floor, wherein the elongated planar element is designed to provide a barrier to wheels of the electric vehicle, an inductive charging element located within the housing, a sensor located within the housing, the sensor for detecting a location of the electric vehicle in relation to the planar element of the charging station, a radio frequency receiver located within the housing, the receiver for receiving a signal including a unique identifier associated with the electric vehicle, a network interface controller communicatively coupled with a communications network, the network interface controller located within the housing and configured for transmitting the unique identifier to a server and for receiving confirmation of payment for inductive charging provided to the electric vehicle and a processor located within the housing, the processor configured for activating the inductive charging element to provide inductive charging to the electric vehicle responsive to receiving the confirmation of payment via the communications network.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

The present invention improves upon the problems with the prior art by providing inductive charging capabilities to electric vehicles in a user-friendly and safe manner. The present invention allows electric vehicle users to park their electric vehicles over a car charging station comprising a parking lot bumper and effectuate inductive charging of the electric vehicle's batteries without requiring the physical connection of any sockets or terminals. The present invention further facilitates the alignment of the electrical vehicle over the charging station by indicating to the user the placement of the vehicle over the charging station and by the sound and feel of the vehicle touching the parking bumper. Further, the parking lot bumper design of the present invention allows the device to be camouflaged, thereby reducing visual clutter. Also, the parking lot bumper design provides a small footprint, thereby reducing physical clutter and savings space in already-congested locales, such as parking garages.

The present invention further allows for the automatic and seamless payment of the inductive charging by accessing previously stored payment information over a communications network. The present invention improves upon the problems with the prior art by providing a system that allows for the storage and re-use of electronic payment data for recurring sales of inductive charging capabilities. The present invention reduces or eliminates the need for a purchase card to be read or swiped through a card reader each time inductive charging occurs.

Figure 1:
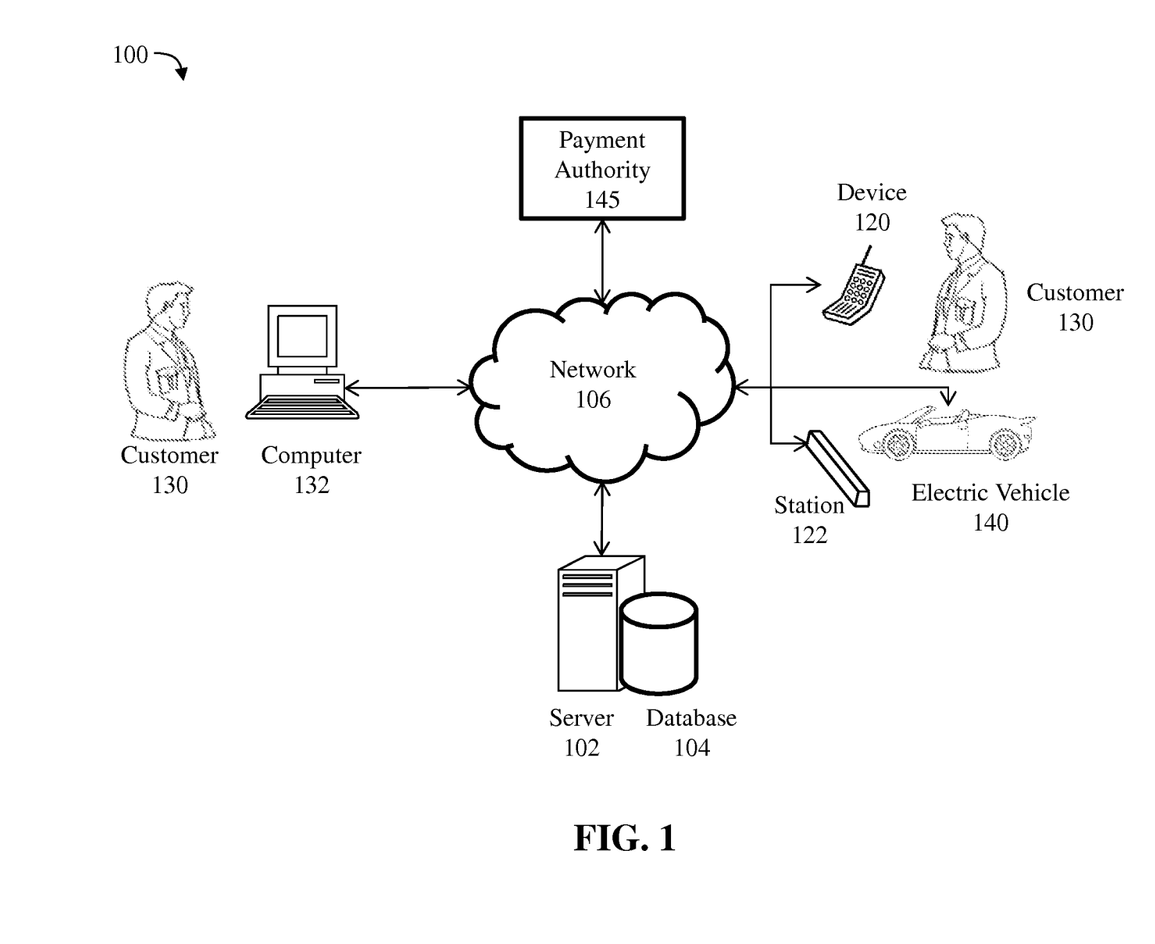
FIG. 1 is a block diagram illustrating the network architecture of a system for facilitating the provision of inductive charging to electric vehicles and payment processing over a communications network, in accordance with one embodiment of the present invention.

Referring now to the drawing figures in which like reference designators refer to like elements, there is shown in FIG. 1 an illustration of a block diagram showing the network architecture of a system 100 and method for facilitating the provision of inductive charging to electric vehicles 140 and payment processing over a communications network 160, in accordance with the principles of the present invention. A prominent element of FIG. 1 is the server 102 associated with repository or database 104 and further coupled with network 106, which can be a circuit switched network, such as the Public Service Telephone Network (PSTN), or a packet switched network, such as the Internet or the World Wide Web, the global telephone network, a cellular network, a mobile communications network, or any combination of the above. Server 102 controls payment processing functionality described in greater detail with reference to FIG. 5 below.

FIG. 1 further includes mobile computing device 120, which may be a smart phone, mobile phone, tablet computer, handheld computer, laptop, or the like. The electric vehicle 140 may also include a computing device, such as computing device 600 described below. Mobile computing device 120 and electric vehicle 140, both corresponding to customer 130, may be communicatively coupled with network 106. Computer 132 may also correspond to the customer 130 and may also be communicatively coupled with network 106. Computer 132 may be a mobile computing device, a desktop computer, a common computer terminal or the like. The charging station 122, described in greater detail below with reference to FIGS. 3 and 4, may also include a computing device, such as computing device 600, and may be communicatively coupled with network 106.

FIG. 1 further shows that server 102 includes a database or repository 104, which may be a relational database comprising a Structured Query Language (SQL) database stored in a SQL server. Devices 120, 122, 140 and 132 may also each include their own database. The repository 104 serves data from a database, which is a repository for data used by server 102 and devices 120, 122, 140 and 132 during the course of operation of the invention. Database 104 may be distributed over one or more nodes or locations that are connected via network 106.

The database 104 may include a customer record for each customer 130. A customer record may include: contact/identifying information for the customer (name, address, telephone number(s), email address, etc.), electronic payment information for the customer, information pertaining to the purchases made by the customer, etc. A customer record may also include a unique identifier for each customer, a unique identifier for each electric vehicle of the customer, the current location of each customer (based on location-based services from the customer's mobile computer or electric vehicle) and a description of past services purchased by the customer. A customer record may further include demographic data for each customer, such as age, sex, income data, race, color, marital status, etc.

In one embodiment, electronic payment information may comprise customer contact/identifying information and any data garnered from a purchase card, as well as any authentication information that accompanies the purchase card. Purchase card data may comprise any data garnered from a purchase card (including credit card number, expiration date, etc.) and any authentication information that accompanies the purchase card. The present invention also supports subscription based models. In this embodiment, electronic payment information may further include a period of time (such as monthly) that defines how often a consumer's account or purchase card is debited, as well as a specified day within the period of time (such as on the 15$^{th}$ of each month) that the given debit is posted. A subscription based model allows customers to use unlimited or limited amounts of inductive charging services in exchange for paying a regular periodic fee. In one embodiment, electronic payment information may comprise identifying information, as well as accompanying credentials, for an account, such as a bank account, a credit account, etc.

FIG. 1 shows an embodiment of the present invention wherein networked computing devices 120, 122, 140 and 132 interact with server 102 and repository 104 (as well as entity 145) over the network 106. Server 102 includes a software engine that delivers applications, data, program code and other information to networked computing devices 120, 122, 140 and 132 (as well as entity 145). It should be noted that although FIG. 1 shows only the networked computers 145, 102, 120, 122, 140 and 132, the system of the present invention supports any number of networked computing devices connected via network 106.

Server 102 and devices 120, 122, 140 and 132 include program logic comprising computer source code, scripting language code or interpreted language code that may be compiled to produce an executable file or computer instructions, or that may be interpreted at run-time, wherein the computer source code performs various functions of the present invention.

Note that although server 102 is shown as a single and independent entity, in one embodiment of the present invention, the functions of server 102 may be integrated with another entity, such as one of the devices 120, 122, 140, 132 or payment authority 145. Further, server 102 and its functionality, according to a preferred embodiment of the present invention, can be realized in a centralized fashion in one computer system or in a distributed fashion wherein different elements are spread across several interconnected computer systems.

FIG. 1 also shows a payment authority 145, which acts to effectuate payments by customer 130 for services or the like. In the course of a sales transaction, server 102 may interface with payment authority 145 to effectuate payment. In one embodiment of the present invention, the payment authority 145 is a payment gateway, which is an e-commerce Application Service Provider (ASP) service that authorizes and processes payments from one party to another. The payment authority 145 may accept payment via the use of purchase cards, i.e., credit cards, charge cards, bank cards, gift cards, account cards, etc.

Figure 2:
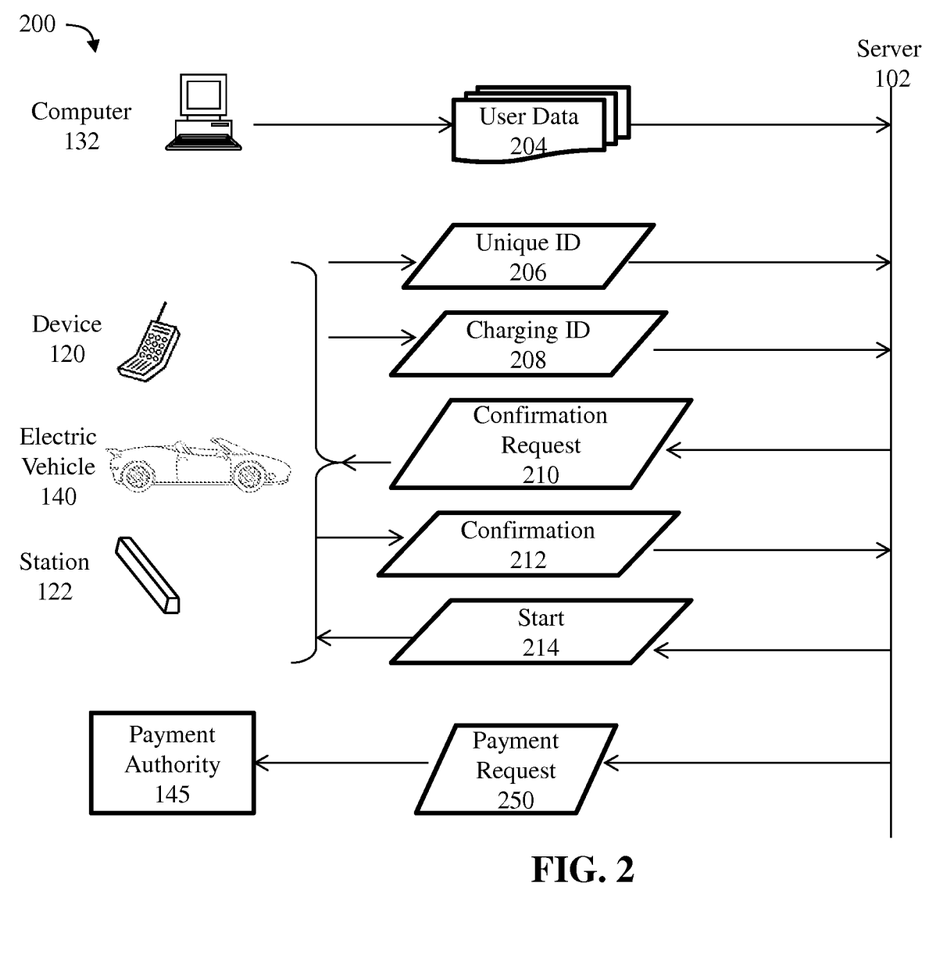
FIG. 2 is a block diagram showing the method by which various data is transferred, processed and managed, according to one embodiment of the present invention.

FIG. 2 is a block diagram showing the method 200 by which various data is transferred, processed and managed, according to one embodiment of the present invention. The block diagram of FIG. 2 shows the flow of data that occurs in an example transaction where customer 130 uses his computer 132 to register or enroll himself and/or his electric vehicle 140 with server 102 and/or effectuate one or more sales of inductive charging services to his electric vehicle 140.

FIG. 2 shows that customer 130 may enroll himself and/or his electric vehicle 140 with server 102 by utilizing his computer 132 to submit user data 204 to server 102 for storage in database 104 as a customer record, as defined above. The user data 204 may include any of the data that may be found in a customer record, as described above. For example, customer 130 may submit purchase card data as electronic payment information associated with his customer record. At the time of inductive charging, the vehicle 140 transmits a unique identifier 206 for the vehicle 140 to the server 102 so as to allow the server 102 to access the correct customer record in database 104. At the time of inductive charging, the station 122 may also transmit to the server 102 a unique charging device identifier 208 that uniquely identifies the charging station 122, so as to allow the server 102 to identify which charging station will be providing the inductive charging to the vehicle 140.

Consequently, the server 102 accesses the correct customer record corresponding to the unique identifier 206 and reads the electronic payment information from the customer record, such as the purchase card the customer 130 designated to pay for the inductive charging services provided by station 122. Then, the server 102 sends a request for confirmation 210 of account debit to the device 120, vehicle 140 or station 122, wherein the request asks the customer 130 to confirm that he or she would like to pay for the inductive charging services with the electronic payment information on file for the customer 130 in his customer record. The customer 130 responds to the server 102 via device 120, vehicle 140 or station 122 with a confirmation 212 of account debit. Subsequently, the server 102 sends a start command 214 to the device 120, vehicle 140 or station 122, wherein the start command 214 initiates the provision of inductive charging services from station 122.

The method 200 also shows that the server 102 may send a payment request 250 to the payment authority 145, wherein the payment request may include the electronic payment information read from the customer record of customer 130 and additionally a monetary amount to charge to the account of the customer 130. In an embodiment wherein the customer 130 has registered for a subscription, the server 102 may or may not debit (depending on whether it is a limited or unlimited subscription) an account of the customer 130. In one embodiment of the present invention, the data files or packets 204 though 250 may be encrypted of unencrypted messages containing alphanumeric data.

Figure 3:
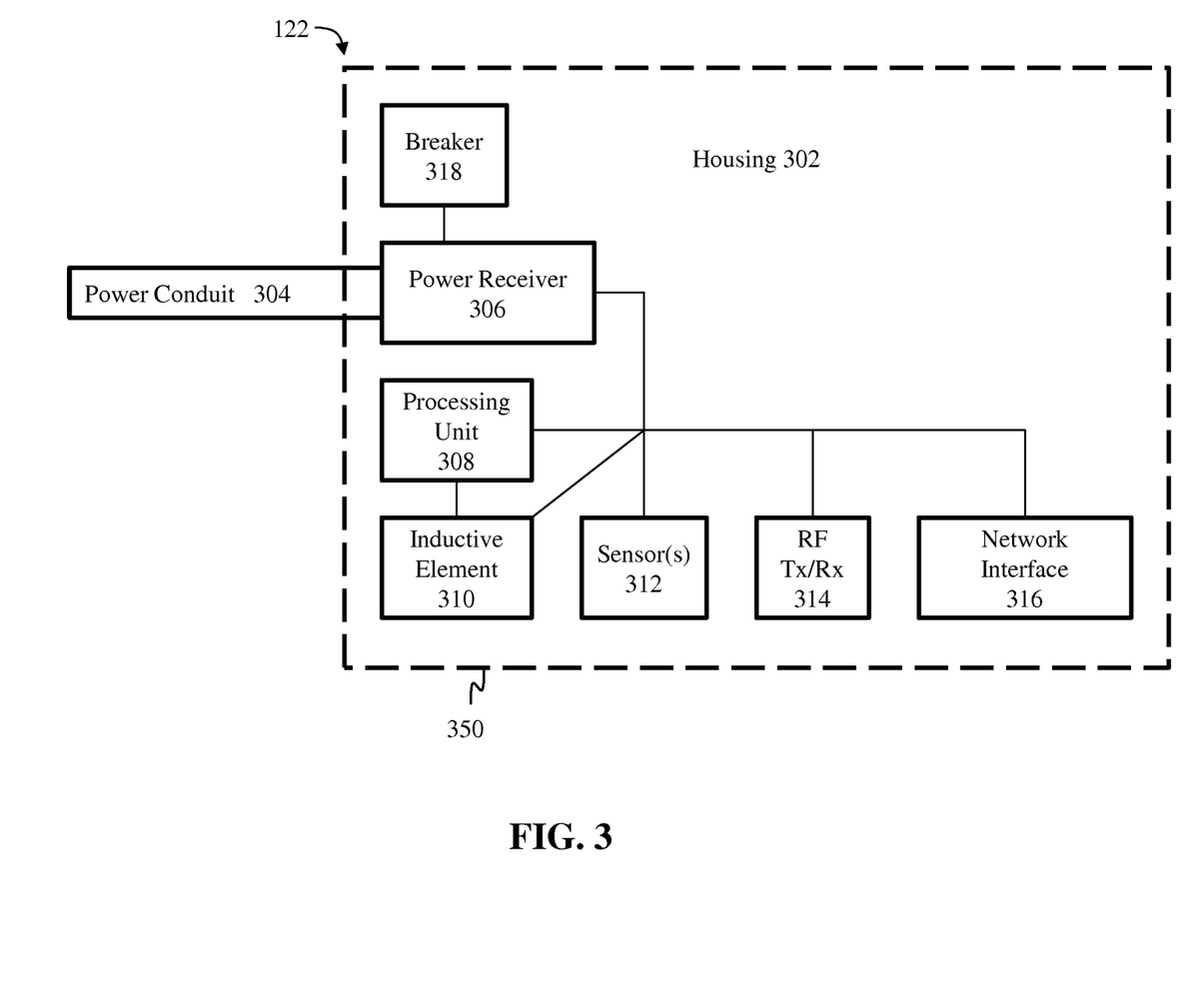
FIG. 3 is a block diagram showing the various components of the charging station, according to one embodiment of the present invention.

FIG. 3 is a block diagram showing the various components of a charging station 122, according to one embodiment of the present invention. The station 122 includes a housing 302 that may have an elongated shape emulating a parking lot bumper, including an elongated planar element 350 disposed at an acute angle to a floor, wherein the elongated planar element 350 is designed to provide a barrier to wheels of the electric vehicle (see FIG. 4).

The station 122 includes a power conduit 304 through which power is to provided to the power receiver 306 of the station 122. The power conduit may support, for example, from about 220V to about 120V. The power receiver 306 provides power to the interior components of the station 122, including the processor or processing unit 308, the inductive charging element 310, which may include an inductive coil, one or more sensors 312, a radio frequency transmitter/receiver 314 and a network interface controller 316. The power receiver 306 is also connected to a breaker 318, which is an automatically operated electrical switch designed to protect an electrical circuit from damage caused by overload or short circuit. The basic function of power receiver 306 is to detect a fault condition and, by interrupting continuity, to immediately discontinue electrical flow.

The inductive element 310 provides inductive charging, i.e., wireless charging, to the electric vehicle 140. The one or more sensors 312 may include one or more magnetic sensors that detect a location of the vehicle 140 in relation to the housing 320 or the planar element 350 and/or one or more pressure sensors that detect front wheels of the vehicle 140 contacting the housing 320 or the first planar element 350 of the housing 320 (see FIG. 4). The radio frequency transmitter/receiver 314 may comprise a low power transmitter/receiver for sending and receiving signals over short distances, such as Bluetooth, 802.11, Wi-Fi, near field communication (NFC) and infrared transmitters/receivers. The radio frequency transmitter/receiver 314 may be used to send and receive data to and from device 120 and/or vehicle 140. The network interface controller 316 may comprise a computer hardware component that connects station 122 to network 106 (in a wired or wireless fashion) using a data link layer standard such as Ethernet or Wi-Fi.

The processing unit 308 may control the inductive charging element 310, the one or more sensors 312, the radio frequency transmitter/receiver 314 and the network interface controller 316. The processing unit 308 provides commands to the various components of station 122, such as controlling activation or deactivation of the inductive element 310, controlling the data transmitted by transmitter/receiver 314 and controlling the data transmitted by network interface controller 316. The processing unit 308 further receives feedback from inductive element 310, data from sensor(s)

312, data included in signals received from transmitter/receiver 314 and data received by network interface controller 316.

Figure 4:
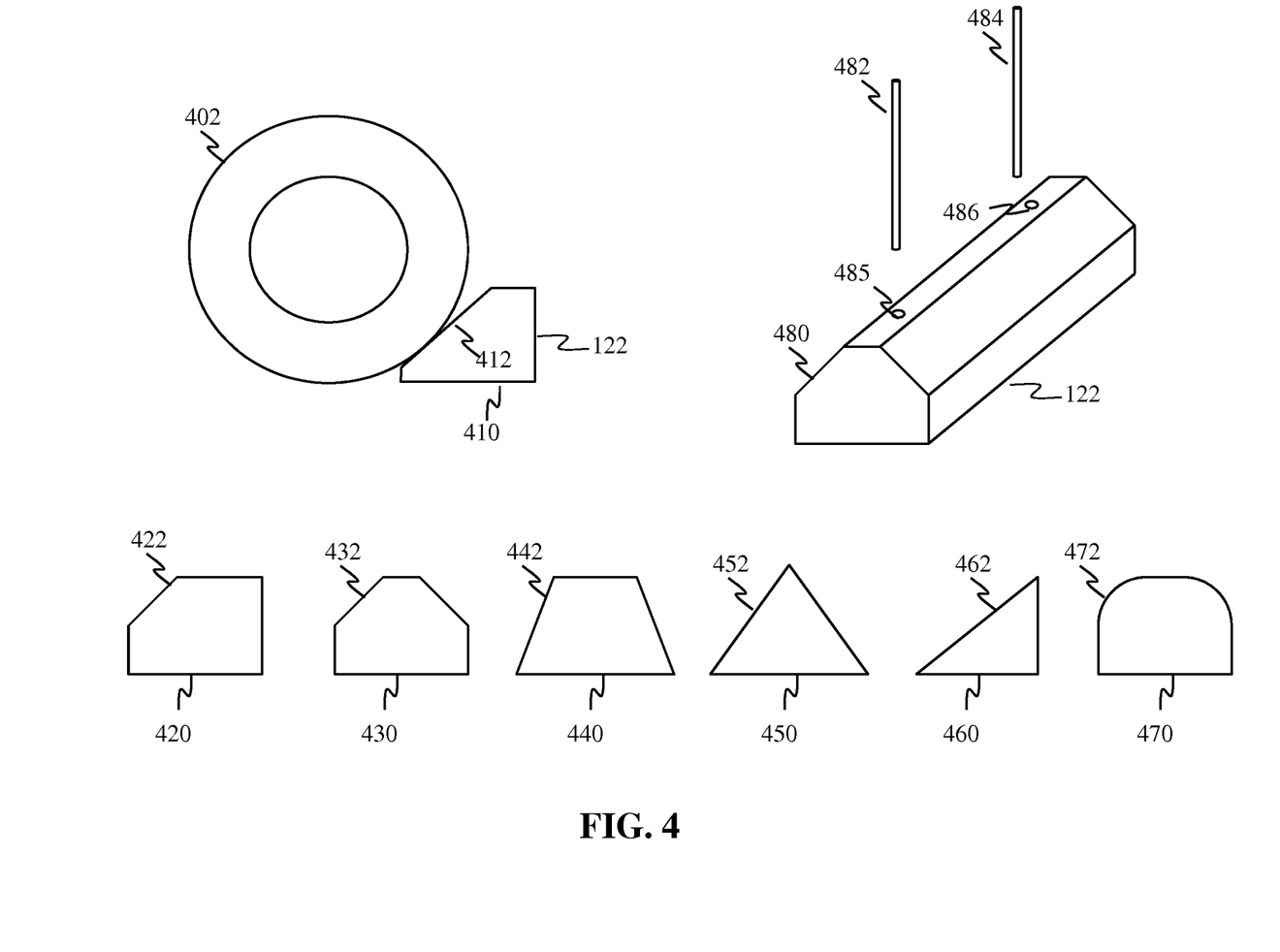
FIG. 4 is an illustration of various embodiments of the charging station, according to one embodiment of the present invention.

FIG. 4 is an illustration of various embodiments of the charging station 122, according to one embodiment of the present invention. In one embodiment, FIG. 4 shows a cross section 410 of a charging station 122 designed to emulate a parking lot bumper, wherein the cross section 410 comprises a substantially wedge-shaped cross section with truncated vertices having a bottom side parallel to the floor, a top side parallel to the floor, a first lateral side 412 (i.e., the first planar element) disposed at an acute angle to a bottom side (or the ground) and a second lateral side perpendicular to the bottom side. FIG. 4 shows that first lateral side 412 of the charging station 122 poses a barrier to the wheel 402 of the vehicle 140 so as to inhibit the vehicle 140 from moving in the direction of the station 122. Note that the acute angle made between the first lateral side 412 and the ground provides a greater surface area for contact with the wheel 402, thereby providing a safe barrier for the wheel 402, as opposed to a sharp corner or a smaller surface area, which may cause a puncture or other wheel damage.

In another embodiment, FIG. 4 also shows that housing 302 of station 122 may further comprise a substantially trapezoidal-shaped cross section with truncated vertices having a bottom side parallel to the floor, a top side parallel to the floor, a first lateral side 480 disposed at an acute angle to the bottom side (or the ground) and a second lateral side also disposed at an acute angle to the bottom side. The housing 302 may also comprise one or more bores 485, 486 for insertion of a stake or rebar 482, 484, which act as fasteners or securing elements that secure the station 122 to the ground. The securing elements may be any hardware or substances for securing an item to the ground, such as rebar, bolts, epoxy, or the like.

In further embodiments, FIG. 4 also includes: embodiment 420 having a substantially wedge shaped cross section with truncated vertices and a first lateral side 422 disposed at an acute angle to the bottom side; embodiment 430 having a substantially trapezoidal shaped cross section with truncated vertices and a first lateral side 432 disposed at an acute angle to the bottom side; embodiment 440 having a substantially trapezoidal shaped cross section and a first lateral side 442 disposed at an acute angle to the bottom side; embodiment 450 having a substantially triangular shaped cross section and a first lateral side 452 disposed at an acute angle to the bottom side; embodiment 460 having a substantially right triangle shaped cross section and a first lateral side 462 disposed at an acute angle to the bottom side; embodiment 420 having a substantially mound shaped cross section and a first lateral side 472 disposed at an angle to the bottom side.

Note the housing 302 emulates a conventional parking lot bumper and comprises a hollow element having an interior volume and an elongated shape. The housing 302 may further be composed of a recycled and/or recyclable material, such as plastic.

Figure 5:
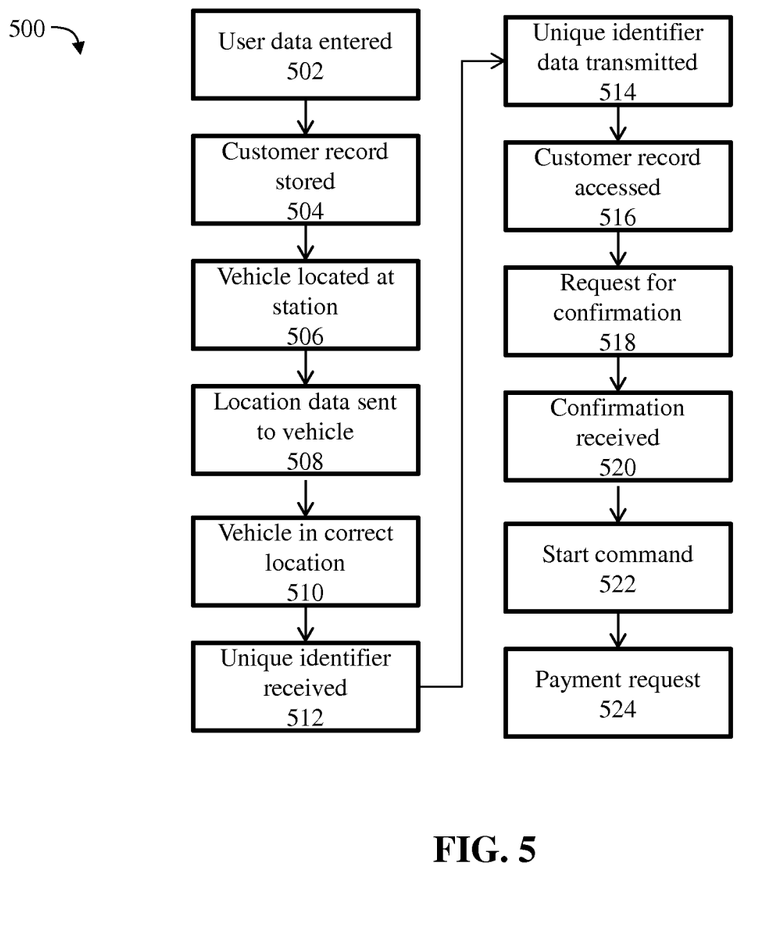
FIG. 5 is a flow chart depicting the general control flow of a method for facilitating the provision of inductive charging to electric vehicles and payment processing over a communications network, according to one embodiment of the present invention.

FIG. 5 is a flow chart depicting the general control flow of a method 500 for facilitating the provision of inductive charging to electric vehicles and payment processing over a communications network, according to one embodiment of the present invention. Method 500 describes the steps that occur when a customer 130 enrolls his self and/or his vehicle 140 with the server 102 and subsequently effectuates a sale of inductive charging services. The process 500 is described with reference to FIG. 2, which shows the data flow of the aforementioned process.

In step 502, the customer 130 enters the user data 204 into the device 132 and sends the user data 204 to the server 102 via communications network 106. In step 504, the server 102 receives the user data 204 and stores the data into one or more newly created customer records.

In step 506, the vehicle 140 pulls up to the station 122 and the sensor(s) 312 sense the location of the vehicle 140 in relation to the planar element 350 of the station 122. In step 508, the transmitter/receiver 314 may transmit signals to the device 120 and/or the vehicle 140, wherein the signals include location data for the vehicle 140. The location data may include directions as to where the vehicle should move such as directional arrows or commands to "move forward," "move back, "move to the left," and "move to the right." The purpose of the signals sent to the device 120 and/or the vehicle 140 is to indicate where the vehicle 140 should be located in order to optimize the inductive charging provided to the vehicle 140 by station 122. The location data sent to device 120 and/or the vehicle 140 may be displayed in viewers or display screens of the device 120 and/or the vehicle 140. In step 510, the sensor(s) 312 sense that the vehicle 140 is situated in the correct location in relation to the planar element 350 of the station 122 and the aforementioned sensor data is transmitted to the processor 308.

In step 512, the transmitter/receiver 314 receives one or more signals from the vehicle 140, wherein the signal includes the unique identifier 206. In step 514, the station 122 transmits the unique identifier 206 for the vehicle 140 to the server 102 via network 106 so as to allow the server 102 to access the correct customer record in database 104. Additionally, the station 122 may also transmit to the server 102 a unique charging device identifier 208 that uniquely identifies the charging station 122, so as to allow the server 102 to identify which charging station will be providing the inductive charging to the vehicle 140. In step 516, the server 102 accesses the correct customer record corresponding to the unique identifier 206 and reads the electronic payment information from the customer record, such as the purchase card the customer 130 designated to pay for the inductive charging services provided by station 122.

In step 518, the server 102 sends a request for confirmation 210 of account debit to the device 120, vehicle 140 or station 122 via network 106, wherein the request asks the customer 130 to confirm that he or she would like to pay for the inductive charging services with the electronic payment information on file for the customer 130 in his customer record. In the case where the request for confirmation 210 is sent to the station 122, the station 122 subsequently sends the request for confirmation 210 to the device 120 or vehicle 140. In an embodiment wherein the customer 130 has registered for a subscription, the request for confirmation 210 may simply be a request to confirm the identity of customer 130.

Consequently, in step 520, the customer 130 responds to the server 102 directly via device 120 or vehicle 140 with a confirmation 212 of account debit. In the case where the confirmation 210 was sent to the station 122, the device 120 or vehicle 140 sends the confirmation 212 to the station 122, which in turn sends the confirmation 212 to the server 102.

In step 522, the server 102 sends a start command 214 to the station 122 via network 106, wherein the start command 214 enables the processor 308 to initiate the inductive charging element 310 to start the provision of inductive charging services from station 122. In step 524, the server 102 may send a payment request 250 to the payment authority 145, wherein the payment request may include the electronic payment information read from the customer record of customer 130 and additionally a monetary amount to charge to the account of the customer 130. In an embodiment wherein the customer 130 has registered for a subscription, the server 102 may or may not debit (depending on whether it is a limited or unlimited subscription) an account of the customer 130.

In an alternative embodiment where the customer 130 has not pre-registered with server 102 via steps 302-304, the pre-registration steps 302-304 may occur using device 120 or vehicle 140 after the vehicle 140 pulls up to the station 122 in step 306-310.

Figure 6:
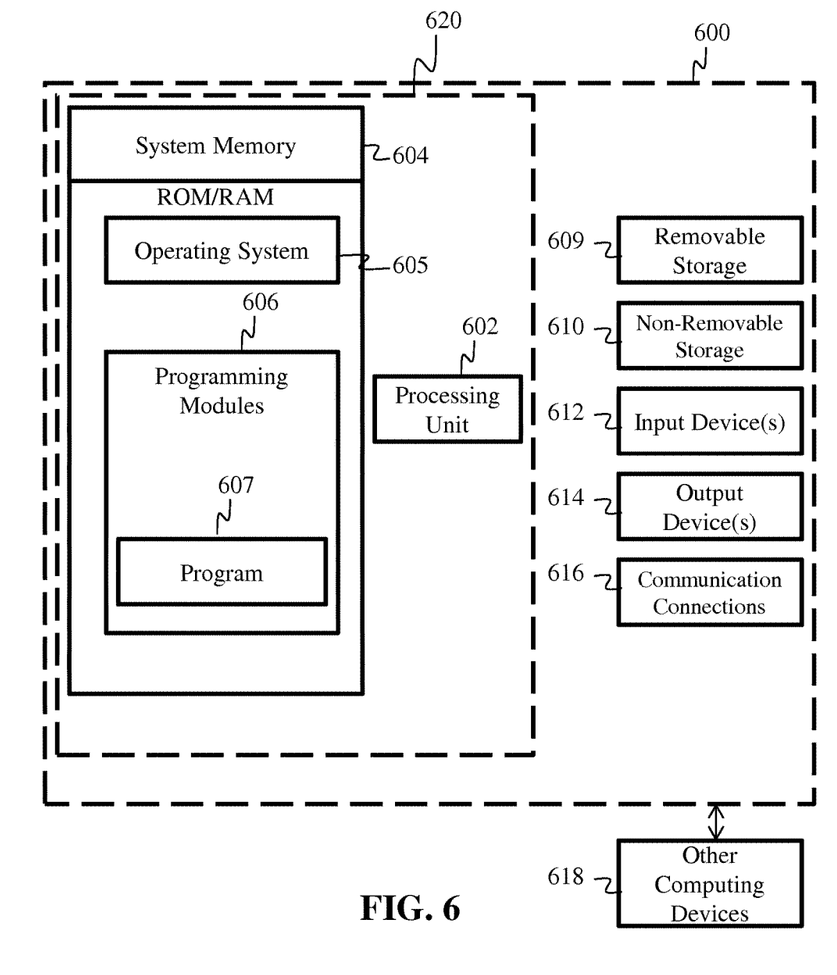
FIG. 6 is a block diagram of a system including an example computing device and other computing devices.

FIG. 6 is a block diagram of a system including an example computing device 600 and other computing devices. Consistent with the embodiments described herein, the aforementioned actions performed by 102, 120, 140, 132 or 122 may be implemented in a computing device, such as the computing device 600 of FIG. 6. Any suitable combination of hardware, software, or firmware may be used to implement the computing device 600. The aforementioned system, device, and processors are examples and other systems, devices, and processors may comprise the aforementioned computing device. Furthermore, computing device 600 may comprise an operating environment for the methods 200 and 500 shown in FIGS. 2 and 5 above.

With reference to FIG. 6, a system consistent with an embodiment of the invention may include a plurality of computing devices, such as computing device 600. In a basic configuration, computing device 600 may include at least one processing unit 602 and a system memory 604. Depending on the configuration and type of computing device, system memory 604 may comprise, but is not limited to, volatile (e.g. random access memory (RAM)), nonvolatile (e.g. read-only memory (ROM)), flash memory, or any combination or memory. System memory 604 may include operating system 605, one or more programming modules 606 (such as program module 607). Operating system 605, for example, may be suitable for controlling computing device 600's operation. In one embodiment, programming modules 606 may include, for example, a program module 607. Furthermore, embodiments of the invention may be practiced in conjunction with a graphics library, other operating systems, or any other application program and is not limited to any particular application or system. This basic configuration is illustrated in FIG. 6 by those components within a dashed line 620.

Computing device 600 may have additional features or functionality. For example, computing device 600 may also include additional data storage devices (removable and/or non-removable) such as, for example, magnetic disks, optical disks, or tape. Such additional storage is illustrated in FIG. 6 by a removable storage 609 and a non-removable storage 610. Computer storage media may include volatile and nonvolatile, removable and non-removable media implemented in any method or technology for storage of information, such as computer readable instructions, data structures, program modules, or other data. System memory 604, removable storage 609, and non-removable storage 610 are all computer storage media examples (i.e. memory storage.) Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by computing device 600. Any such computer storage media may be part of device 600. Computing device 600 may also have input device(s) 612 such as a keyboard, a mouse, a pen, a sound input device, a camera, a touch input device, etc. Output device(s) 614 such as a display, speakers, a printer, etc. may also be included. The aforementioned devices are only examples, and other devices may be added or substituted.

Computing device 600 may also contain a communication connection 616 that may allow device 600 to communicate with other computing devices 618, such as over a network in a distributed computing environment, for example, an intranet or the Internet. Communication connection 616 is one example of communication media. Communication media may typically be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media. The term computer readable media as used herein may include both computer storage media and communication media.

As stated above, a number of program modules and data files may be stored in system memory 604, including operating system 605. While executing on processing unit 602, programming modules 606 may perform processes including, for example, one or more of the methods 200 and 500 shown above. The aforementioned processes are examples, and processing unit 602 may perform other processes. Other programming modules that may be used in accordance with embodiments of the present invention may include electronic mail and contacts applications, word processing applications, spreadsheet applications, database applications, slide presentation applications, drawing or computer-aided application programs, etc.

Generally, consistent with embodiments of the invention, program modules may include routines, programs, components, data structures, and other types of structures that may perform particular tasks or that may implement particular abstract data types. Moreover, embodiments of the invention may be practiced with other computer system configurations, including hand-held devices, multiprocessor systems, microprocessor-based or programmable consumer electronics, minicomputers, mainframe computers, and the like. Embodiments of the invention may also be practiced in distributed computing environments where tasks are performed by remote processing devices that are linked through a communications network. In a distributed computing environment, program modules may be located in both local and remote memory storage devices.

Furthermore, embodiments of the invention may be practiced in an electrical circuit comprising discrete electronic elements, packaged or integrated electronic chips containing logic gates, a circuit utilizing a microprocessor, or on a single chip (such as a System on Chip) containing electronic elements or microprocessors. Embodiments of the invention may also be practiced using other technologies capable of performing logical operations such as, for example, AND, OR, and NOT, including but not limited to mechanical, optical, fluidic, and quantum technologies. In addition, embodiments of the invention may be practiced within a general purpose computer or in any other circuits or systems.

Embodiments of the present invention, for example, are described above with reference to block diagrams and/or operational illustrations of methods, systems, and computer program products according to embodiments of the invention. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments of the invention have been described, other embodiments may exist. Furthermore, although embodiments of the present invention have been described as being associated with data stored in memory and other storage mediums, data can also be stored on or read from other types of computer-readable media, such as secondary storage devices, like hard disks, floppy disks, or a CD-ROM, or other forms of RAM or ROM. Further, the disclosed methods' stages may be modified in any manner, including by reordering stages and/or inserting or deleting stages, without departing from the invention.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A system for facilitating charging of an electric vehicle over a communications network, the system comprising:
   a computing device on the electric vehicle, the computing device commutatively coupled with the communications network, the computing device comprising:
      a radio frequency (RF) transmitter of the computing device;
      a RF receiver of the computing device; and
      a processor of the computing device configured for transmitting a unique identifier of a first user via the RF transmitter, receiving a confirmation of account debit via the RF receiver, and transmitting a user confirmation of account debit via the RF transmitter, response to receiving input from a first user;
   a server communicatively coupled with the communications network, the server comprising:
      a database for storing customer records, wherein each customer record includes a unique identifier and electronic payment information for a particular user; and
      a processor of the computing device configured for:
         receiving a unique identifier for the first user via the communications network;
         transmitting a confirmation of account debit to a computing device of the first user via the communications network;
         receiving a user confirmation of account debit from the computing device of the first user via the communications network;
         accessing electronic payment information from a consumer record of the first user based on the unique identifier for the first user;
         transmitting the electronic payment information of the first user to a payment authority via the communications network;
         receiving a confirmation of payment from the payment authority via the communications network; and
         transmitting the confirmation of payment by the first user via the communications network; and
   a charging station for the electric vehicle, comprising:
      a housing having an elongated shape emulating a parking bumper, including an elongated planner element disposed at an acute angle to a floor, where in that elongated planar element is designed to provide a barrier to wheels of the electric vehicle, and wherein the housing is secured to the floor so as to prevent movement of the housing;
      an inductive charging element located within the housing;
      a sensor located within the housing, the sensor for detecting a location of the electric vehicle in relation to the planar element of the charging station;
      a RF receiver of the charging station located within the housing, the RF receiver of the charging station for receiving a signal including the unique identifier for the first user associated with the electric vehicle;
      a network interface controller communicatively coupled with the communications network, the network interface controller located within the housing and configured for transmitting the unique identifier for the first user to the server and for receiving, from the server confirmation of payment by the first user for inductive charging provided to the electric vehicle; and
      a processor located within the housing, the processor configured for activating the inductive charging element to provide inductive charging to the electric vehicle responsive to receiving the confirmation of payment by the first user via the communications network.

2. The system of claim 1, wherein the housing further comprises a substantially trapezoidal-shaped cross section having a bottom side parallel to the floor, a topside parallel to the floor, and a first lateral side disposed at an acute angle to the bottom side.

3. The system of claim 1, wherein the housing further comprises a substantially wedge shaped cross section having a bottom side parallel to the floor, a top side parallel to the floor, a first lateral side disposed at an acute angle to a bottom side and a second lateral side perpendicular to the bottom side.

4. The system of claim 2, wherein the inductive charging element further comprises an induction coil.

5. The system of claim 4, wherein the sensor comprises a pressure sensor for detecting pressure on the planar element of the charging station due to contact with the wheels of the electric vehicle.

6. The system of claim 4, wherein the sensor comprises a magnetic sensor for detecting a location of the electric vehicle in relation to the planar element of the charging station.

7. The system of claim 4, further comprising a radio frequency transmitter located within the housing, the transmitter for transmitting a signal including data pertaining to the location of the electric vehicle in relation to the planar element of the charging station, as the location of the electric vehicle was detected by the sensor.

8. The system of claim 7, wherein the network interface controller is further configured for transmitting a charging station identified to the server via the communication network.

9. The system of claim 8, wherein the network interface controller is further configured for receiving from the server a request for confirmation of account debit in association with the unique identifier, via the communications network.

10. The system of claim 9, wherein the radio frequency transmitter is further configured for transmitting to the computing device of the first user a signal including the request for confirmation of account debit in association with the unique identifier.

11. The system of claim 10, where in the radio frequency receiver is further configured for receiving a signal from the computing device of the first user including a confirmation of account debit in association the unique identifier.

12. The system of claim 11, wherein the network interface controller is further configured for transmitting to the server the confirmation of account debit in association with the unique identifier.

13. A system for facilitating charging of an electric vehicle over a communications network, the system comprising:
   a computing device on the electric vehicle, the computing device commutatively coupled with the communications network, the computing device comprising:
      a radio frequency (RF) transmitter of the computing device;
      a RF receiver of the computing device; and
      a processor of the computing device configured for transmitting a unique identifier of a first user via the RF transmitter, receiving a confirmation of account debit via the RF receiver, and transmitting a user confirmation of account debit via the RF transmitter, response to receiving input from a first user;
   a server communicatively coupled with the communications network, the server comprising:
      a database for storing customer records, wherein each customer record includes a unique identifier and electronic payment information for a particular user; and
      a processor of the computing device configured for:
         receiving a unique identifier for the first user via the communications network;
         transmitting a confirmation of account debit to a computing device of the first user via the communications network;
         receiving a user confirmation of account debit from the computing device of the first user via the communications network;
         accessing electronic payment information from a consumer record of the first user based on the unique identifier for the first user;
         transmitting the electronic payment information of the first user to a payment authority via the communications network;
         receiving a confirmation of payment from the payment authority via the communications network; and
         transmitting the confirmation of payment by the first user via the communications network; and
   a charging station for the electric vehicle, comprising:
      a housing having an elongated shape emulating a parking bumper, including an elongated planar element disposed at an acute angle to a floor, where in the elongated planar element is designed to provide a barrier to wheels of the electric vehicle, and wherein the housing is secured to the floor so as to prevent movement of the housing;
      a fastener for fastening the housing to a floor;
      an inductive charging element located within the housing;
      a sensor located within the housing, the sensor for detecting a location of the electric vehicle in relation to the planar element of the charging station;
      a RF transmitter located within the housing, the RF transmitter for transmitting a signal including data pertaining to the location of the electric vehicle in relation to the planar element of the charging station;
      a RF receiver of the charging station located within the housing, the RF receiver of the charging station for receiving a signal including the unique identifier for the first user associated with the electric vehicle;
      a network interface controller commutatively coupled with the communications network, the network interface controller located within the housing and configured for transmitting the unique identifier for the first user to the server and for receiving, from the server, confirmation of payment by the first user for inductive charging provided to the electric vehicle; and
      a processor located within the housing, the processor configured for activating the inductive charging element to provide inductive charging to the electric vehicle responsive to receiving the confirmation of payment by the first user via the communications network.

14. The system of claim 13, wherein the housing further comprises it substantially trapezoidal-shaped cross section have a bottom side parallel to the floor, a top side parallel to the floor, and a first lateral side disposed at an acute angle to the bottom side.

15. The system of claim 14, wherein the inductive charging element further comprises an induction coil.

16. The system of claim 15, wherein the sensor comprises a pressure sensor for detecting pressure on the planar element of the charging station due to contact with the wheels of the electric vehicle.

17. The system of claim 15, wherein the sensor comprises a magnetic sensor for detecting a location of the electric vehicle in relation to the planar element of the charging station.

18. The system of claim 17, wherein the network interface controller is further configured for transmitting a charging station identifier to the server via the communications network.

19. A system for facilitating charging of an electric vehicle over a communications network, the system comprising:
   a computing device on the electric vehicle, the computing device commutatively coupled with the communications network, the computing device comprising:
      a radio frequency (RF) transmitter of the computing device;
      a RF receiver of the computing device; and
      a processor of the computing device configured for transmitting a unique identifier of a first user via the RF transmitter, receiving a confirmation of account debit via the RF receiver, and transmitting a user confirmation of account debit via the RF transmitter, response to receiving input from a first user;
   a server communicatively coupled with the communications network, the server comprising:

a database for storing customer records, wherein each customer record includes a unique identifier and electronic payment information for a particular user; and a processor of the computing device configured for:
   receiving a unique identifier for the first user via the communications network;
   transmitting a confirmation of account debit to a computing device of the first user via the communications network;
   receiving a user confirmation of account debit from the computing device of the first user via the communications network;
   accessing electronic payment information from a consumer record of the first user based on the unique identifier for the first user;
   transmitting the electronic payment information of the first user to a payment authority via the communications network;
   receiving a confirmation of payment from the payment authority via the communications network; and
   transmitting the confirmation of payment by the first user via the communications network; and a charging station for the electric vehicle, comprising:
   a housing having an elongated shape emulating a parking bumper, including an along gated planar element dispose it an acute angle to a floor, wherein the long gated planar element is designed to provide a barrier to wheels of the electric vehicle, and wherein the housing is secured to the floor so as to prevent movement of the housing;
   an inductive charging element located within the housing;
   a sensor located within the housing, the sensor for detecting whether the electric vehicle is located in a correct location in relation to the planar element of the charging station;
   a RF transmitter located within the housing, the RF transmitter for transmitting a signal including data pertaining to the location of the electric vehicle in relation to the planar element of the charging station;
   a RF receiver of the charging station located within the housing, the RF receiver of the charging station for receiving a signal including the unique identifier for the first user associated with the electric vehicle;
   a network interface controller communicatively coupled with the communications network, the network interface controller located within the housing and configured for transmitting the unique identifier for the first user to the server and for receiving, from the server, confirmation of payment by the first user for inductive charging provided to the electric vehicle; and
   a processor located within the housing the processor configured for activating the inductive charging element to provide inductive charging to the electric vehicle responsive to detecting that the electric vehicle is located in the correct location in relation to the planner element and responsive to receiving the confirmation of payment by the first user via the communications network.

\* \* \* \* \*